United States Patent [19]

Sugeno et al.

[11] 4,022,860

[45] May 10, 1977

[54] METHOD FOR PRODUCING ARCUATELY CURVED FILM CASINGS

[75] Inventors: Katsuhiko Sugeno; Toshimi Yamami, both of Iwaki, Japan

[73] Assignee: Kureha Kagaku Kogyo Kabushiki Kaisha, Tokyo, Japan

[22] Filed: Jan. 13, 1975

[21] Appl. No.: 540,602

[30] Foreign Application Priority Data

Jan. 19, 1974 Japan .................................. 49-8704

[52] U.S. Cl. .............................. 264/95; 264/178 R; 264/209; 264/210 R; 264/281; 264/285; 264/290 R; 264/339

[51] Int. Cl.² .................. A22C 13/00; B29C 17/07

[58] Field of Search ................ 264/95, 210 R, 281, 264/290 R, 339, 178 R, 176 R, 209, 230, 94, 98, 99, 280, 285, 288, 295

[56] References Cited

UNITED STATES PATENTS

| | | | |
|---|---|---|---|
| 2,136,566 | 11/1938 | Schnecko et al. ................... | 264/95 |
| 2,246,236 | 6/1941 | Becker ............................ | 99/176 R |
| 2,452,080 | 10/1948 | Stephenson ........................ | 264/95 |
| 2,517,570 | 8/1950 | Irons ................................. | 264/230 |
| 2,838,405 | 6/1958 | Huckfeldt ......................... | 264/285 |
| 2,925,621 | 2/1960 | Parth .................................. | 264/95 |
| 3,155,752 | 11/1964 | Riegler ............................. | 264/95 |
| 3,454,695 | 7/1969 | Holmgren ......................... | 264/209 |
| 3,679,435 | 7/1972 | Klenk et al. ...................... | 264/230 |

FOREIGN PATENTS OR APPLICATIONS

| | | | |
|---|---|---|---|
| 1,163,248 | 9/1969 | United Kingdom .............. | 264/285 |

*Primary Examiner*—Jeffery R. Thurlow
*Attorney, Agent, or Firm*—Lane, Aitken, Dunner & Ziems

[57] ABSTRACT

A method for producing arcuately curved film casings particularly suitable for a foodstuff such as meat or the like, by an inflation process, wherein a non-stretched resin tube is advanced along and in contact with a circumferential surface of a cylindrical shaping member at the time of inflation of the tube.

5 Claims, 6 Drawing Figures

METHOD FOR PRODUCING ARCUATELY CURVED FILM CASINGS

BACKGROUND OF THE INVENTION:

1. Field of the Invention

This invention relates to a method for producing an arcuately curved film casing of a thermoplastic synthetic resin material which is suitable for packaging an extrudable material in the form of an arcuately bent cylindrical roll similar to a sausage stuffed in hog's or sheep's intestine.

2. Description of the Prior Art:

Tubular film casings of a thermo-contractive synthetic resin material, for example, of a vinylidene chloride-vinyl chloride coplymer, are presently widley used for packaging foodstuffs such as ham, sausage, boiled fish meat paste, cheese and the like. The hams and sausages packed in these film casings are generally in the form of straight cylindrical rolls, unlike the sausages packed in the hog's or sheep's intestine which have an arcuately curved shape. Arcuately curved rolls of ham or sausage are preferred to straight ones since they give a luxurious appearance when served on a plate or displayed in a show window. For this reason, there have been made various attempts to produce curved rolls of ham and sausages with use of platic film casings, for example, by heat-setting straight rolls in an arcuate shape in a curved retainer. However, this method encounters difficulties in that the heat-setting operation requires a large amount of additional labor and in that the heat-set casings contain wrinkles to such a degree as to lower the commercial value of the final products.

In order to eliminate these difficulties, attempts have also been made to produce a curved film casing by arcuately deforming a tubular plastic film casing. For example, British Pat. Specification No. 1,163,248 describes a method for producing a curved film casing, where the film is initially formed into a straight tubular form and then curved arcuately by thermal contraction, more specifically, by heating a certain circumferencial portion of the tubular film along the its length. In this connection, another similar method is described in British Pat. Specification No. 1,227,249 where a circumferencial portion of a tubular film is likewise heated along the length of the tube. However, in the latter method, the heating treatment is intended not to cause deformation to the tubular film but to cause variations in thermal contraction coefficient in the circumferencial direction of a transverse section of the film tube such that, when the film casing is heated after being filled, for example, with sausage material, the content of the casing will spontaneously bend arcuately due to the variations in the thermal contraction coefficient of the film.

The above-mentioned prior-art methods, however, have a drawback in that the production process has to include an additional step for the thermal treatment of the casing, which not only requires complicated operation but reduces the thermal contraction coefficient of the film casing since the tubularly preformed thermo-contractive film has to be inevitably subjected to localized heating treatment. The thermal treatment also reduces the mechanical strength of the film, inviting breakage or rupture when filling the casing.

Because of the foregoing, there has been a strong demand for a method which is capable of producing arcuately curved film casings from a synthetic resin material in a more simplified manner.

SUMMARY OF THE INVENTION

It is therefore an object of the present invention to provide a method for producing arcuately curved tubular film casings of satisfactory quality in a significantly simplified operation.

In order to attain this object and as a result of collaborative research, the present inventors found that, in the production of tubular film casings by the inflation method, the film casings are formed into an arcuately curved shaped by inflating them while wound around a cylindrical drum. Accordingly, in the present process, a non-stretched tube of the thermoplastic resin material is advanced along and in contact with the circumferencial surface of a cylindrical shaping drum and inflated while so wrapped to produce an arcuately curved film casing having a desired radius of curvature.

The above and other objects, features and advantages of the present invention will become clear from the following description of the invention and the appended claims, taken in conjunction with the accompanying drawings which show by way of example a preferred embodiment of the present invention.

PARTICULAR DESCRIPTION OF THE INVENTION

Figure 1:
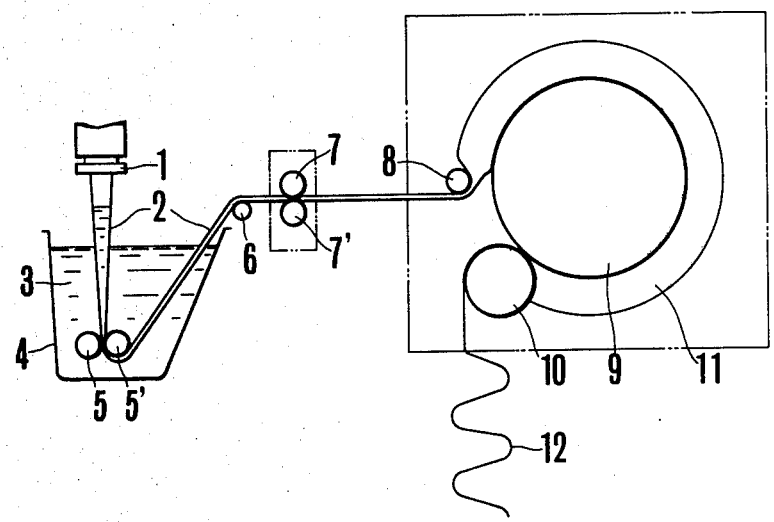
FIG. 1 is a schematic view showing an arcuately curved film casing producing process incorporating the method of the invention.

The invention will now be described more particularly with reference to the accompanying drawings, wherein a thermoplastic synthetic resin material, for example, of a vinylidene chloride-based copolymer is extruded in a fluidized state from a tubular nozzle 1 and the extruded resin tube 2 is led to and cooled in a cooling bath 4 which contains a suitable coolant under circulation. For example, the resin tube 2 is cooled immediately by cold water 3 and the cooled non-crystalline nonstretched resin tube 2 is led onto the surface of a cylindrical shaping drum 9 through and past pinch rollers 5, 5', guide roller 6, pinch rollers 7, 7' and guide roller 8. The resin tube 2 is continuously inflated while being advanced along and in contact with the circumferencial surface of the drum 9. The inflation of the resin tube 2 is caused, while the tube is between two sets of pinch rollers i.e. by the pinch rollers 7, 7' and a second constituted by the forming drum 9 and a pinch roller 10, by a gas (e.g., air, nitrogen gas or the like) which is occluded or sealed in the filming tube between the just-mentioned two sets of pinch rollers. The resin tube 2 is inflated on the circumference of the shaping drum 9 as shown at 11, the resin tube undergoing stretching to a greater degree at the outer periphery than at the inner periphery to present an arcuately curved form. The arcuately formed film casing is taken up on a bobbin or a hank (not shown).

It is important to take up the arcuately formed film casing with a tension which will not destroy the arcuate shape of the film. This is because, if the curved film casing is unduly tensioned in the longitudinal direction, the film is stretched again to completely destroy or more or less to straighten the arcuate shape of the film casing. For this reason, the arcuately formed film casing 12 which comes out past the pinch roller 10 should be folded without imposing any tension thereto as shown in FIG. 1 or should be taken up on a bobbin or a hank with a tension as would not cause restretching of the shaped film casing 12.

In the present invention, the film casing is stretched while being inflated in an arcuately curved shaped between the first pinch rollers 7, 7' and the second pinch roller 10, the stretching of the film in the longitudinal direction and in the circumference (in the transverse cross section) each being preferably in the range of 1.1 to 4.0, respectively.

In the method of the present invention, though it is a matter of secondary significance, a cooling or heating medium may be passed through the interior of the shell of the shaping drum 9 to control the surface temperatures of the drum, thereby to control the stretching and orientation as well as to assist the shaping of the film. Alternatively, the outer periphery of the inflated tube may be heated by hot air. In this connection, it should be understood that the just-mentioned heating or cooling operation is a matter of secondary significance and is not essential for imparting the arcuate shape to the film casing.

Figure 2:
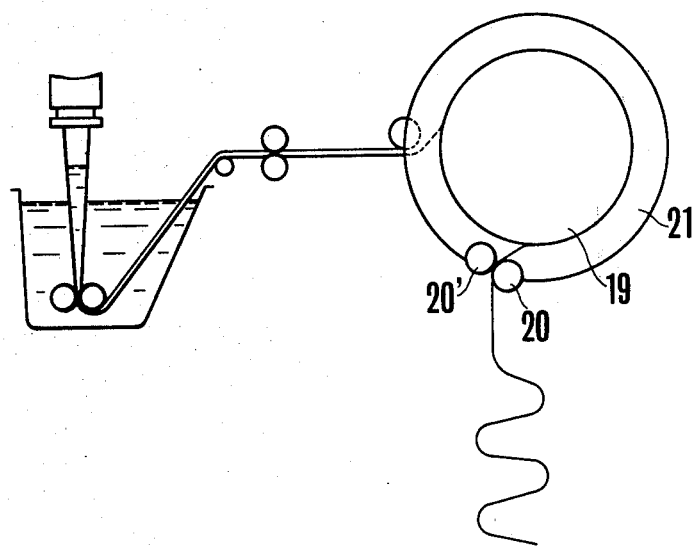
FIG. 2 is a view similar to FIG. 1 but showing another film casing producing process incorporating the method of the invention.
Figure 3:
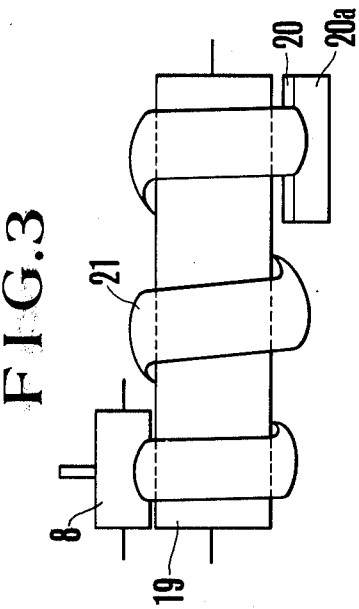
FIG. 3 is a diagrammatic view showing the inflating step as in the process of FIG. 2.

When shaping the film casing in an arcuate form in the inflation step, the tubular film 21 may be wound a number of turns around the circumference of the shaping drum 19 as shown particularly in FIGS. 2 and 3, if desired. In the modified method shown in FIGS. 2 and 3, a further set of pinch rollers 20, 20' are mounted in spaced relation relative to the shaping drum 19 instead of the afore-mentioned pinch roller 10.

Figure 5:
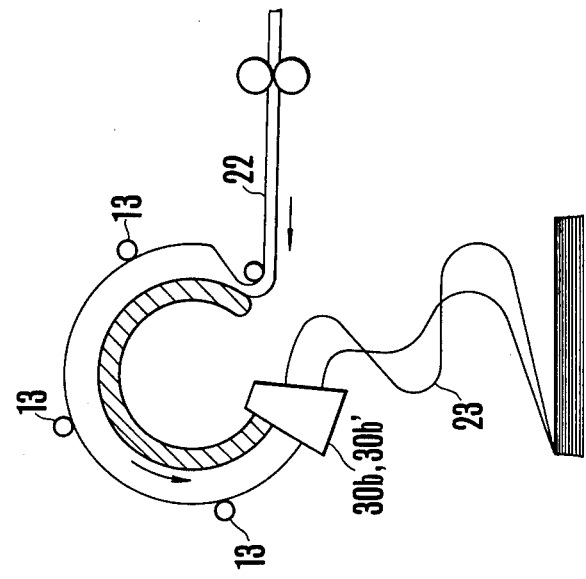
FIG. 5 is a diagrammatic view showing an example of a cylindrical shaping member as used in the inflating step of the film casing manufacturing process.
Figure 6:
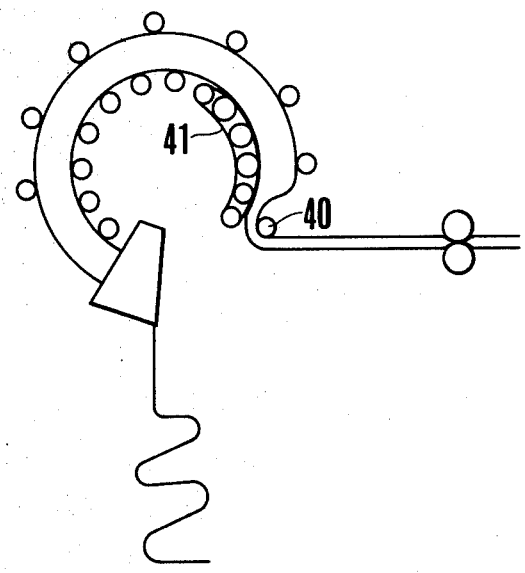
FIG. 6 is a diagrammatic view showing another example of a cylindrical shaping member as used in the inflating step of the film casing manufacturing process.

The shaping member such as the shaping drum 19 need not be cylindrical in form but may have a shell of a semi-circular shape resembling a horse shoe in a transverse section as shown in FIG. 5. Alternatively, the shaping member may be replaced by a number of bars or rolls which are arranged circularly in transverse section so as to support the film under inflation as shown in FIG. 6. FIG. 6 shows another shaping means consisting of a number of bars or rolls which are circularly arranged in a horse shoe-like transverse section and those bars or rolls in close proximity to guide roller 40 being covered with a rubber belt 41. Accordingly, it should be understood that the cylindrical shaping member as referred to herein includes a sectionally semicircular shell construction. In the example of FIG. 5, the tubular film 22 is inflated while being slided along the outer surface of the shaping member 29, and the shaped tubular film 23 is discharged in a flattened state through the paired pinch rollers 30b, 30b' which remove the inflation gas completely from the interior of the shaped film casing. If desired, a number of pressing rollers 13 may be provided at a predetermined space from the shaping member 29 to hold the inflated tube against the circumference of the shaping member 29.

Figure 4:
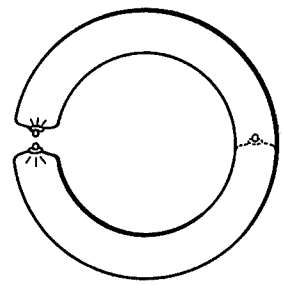
FIG. 4 is a diagrammatic view showing a sausage as produced using the arcuately curved film casing by the method of the invention.

FIG. 4 shows a sausage produced by filling and sealing a comminuted sausage meat in an arcuately curved thermally contractive tubular film as produced by the method of the invention, followed by a thermal treatment with hot water.

The arcuately curved film casing producing method of the invention has various advantages over the aforementioned prior-art method, as itemized below.

(1) No heating treatment or heating apparatus as used in the conventional methods is required;

(2) The acuately curved film casing can be manufactured in the production line of normal straight tubes, by slightly modifying the inflation step;

(3) Film casings of different curvatures can be produced easily by changing the radius of curvature of the shaping member, including film casings of a relatively small radius of curvature of 20 mm to 30 mm. In other words, a film casing of a desired radius of curvature can be produced irrespective of the folding diameter of the tubular film;

(4) For these reasons, the curved film casings can be produced at a low cost and with high productivity; and (5) The curved film casings by the method of the invention can have a small radius of curvature and are uniform in quality, without bearing traces of heating treatment as in the prior-art methods. They are also free from wrinkles which are usually present in the conventional curved film casings after being filled with a stuffing material since the latter have a smaller coefficient of contraction at the inner periphery that at the outer periphery. The film produced by the method of the invention are wrinkle-free and lustrous both at the inner and outer peripheries.

Examples of thermoplastic synthetic resin materials useful in the present invention include vinylidene chloride-based copolymer, polyvinyl chloride, vinyl chloride-based copolymer, polyamide, polyester, polyethylene, polypropylene, polystyrene, vinyl acetate-based copolymer, polyvinyl alcohol, ethylene-vinyl acetate copolymer, ethylene-ethylacrylate copolymer and the like. The present invention is suitably applicable to any of these materials which have been extruded either by simple extrusion or by coextrusion.

In the present invention, it is particularly preferred to employ vinylidene chloride-based copolymer as the thermoplastic synthetic resin material. More particularly, it has been found that a non-stretched tube obtained by extruding and cooling a resin composition comprising a copolymer which consists of 65 to 95% by weight of vinylidene chloride and 5 to 35% by weight of a copolymerizable monomer such as vinyl chloride, acrylonitrile or the like, and, if necessary, 3 to 20% by weight of additives including a plasticizer and a stabilizer, can be formed into a tube film having a large thermal contraction coefficient by inflation at normal temperature or under gentle heating conditions. It appears that the present invention gives best results when a vinylidene chloride-based copolymer is used as the thermoplastic resin material.

The term "inflation" as used herein refers to stretching and orientation of the film by inflating a non-stretched resin tube with use of a pressurized fluid.

The present invention will be illustrated more particularly by the following examples, however, it should be understood that the invention is not limited to the particular examples shown.

EXAMPLE 1

A mixture which had an initial composition of 100 parts by weight of a vinylidene chloride-based copolymer including 80 parts of vinylidene chloride and 20 parts of vinyl chloride, 7 parts by weight of a dioctylazipate, plasticizer and 1.5 parts by weight of epoxidized linseed oil, was extruded in a fluidized state from a tubular nozzle, which was, after supercooling, stretched and oriented by inflation on a shaping drum as shown in FIG. 1 to obtain an arcuately curved thermocontrative film casing having a folded diameter of 50 mm. The conditions of production and properties of the produced curved casing were as follows:

Shaping drum radius — 60 mm
Non-stretched tube surface temperature before inflation — 10° – 15° C
Shaping drum surface temperature — 15° – 20° C
Inflation atmosphere temperature (room temperature) — 25° – 30° C
Speed ratio of 1st to 2nd pinch rollers — 1:2.5
Natural inflation ratio in circumferenctial direction — 1:3.9
Curved film casing take-up speed — 15 m/min
Curved film casing thickness — 60 $\mu$ (at outer periphery)
40 $\mu$ (at inner periphery)
Contraction in hot water (100° C, 3 min)
  Inner periphery
    longitudinal direction — 20%
    circumferencial direction — 15%
  Outer periphery
    longitudinal direction — 24%
    circumferencial direction — 20%
Radius of curvature (measured as in Example 3) — 60 – 65 mm After left standing at room temperature for one week and after a darts-forming operation, the thus obtained curved film casing was filled with comminuted sausage meat, followed by sealing, heating with hot water and unwrinkling. This resulted in a sausage stuffed in a curved film casing which had a radius of curvature of 60 to 65 mm same as before being filled with the sausage meat. The film casing showed no wrinkles in any portion but had good luster to form a curved sausage of high commercial value.

For the purpose of comparison, a sausage was produced under the same conditions but using a non-shaped straight tube film, which resulted in a sausage of a straight rod shape.

EXAMPLE 2

A mixture which has an initial copolymer consisting of 75 parts by weight of vinylydene chloride and 25 parts by weight of vinyl chloride; 7 parts by weight of a dibutyl sebacate, plasticizer 1.5 parts by weight of epoxidized soybean oil, and 1.5 parts by weight of titanium oxide was used as a starting material for forming a tube film under the same conditions as in Example 1, except that the folded diameter of the film was increased to 120 mm to see if the radius of curvature would remain same as that of the 50 mm diameter tube of Example 1.

As a result, it was confirmed that the tube film was imparted with a curvature of the same radius irrespective of the change in the folded diameter of the tube, as long as the radius of the shaping drum remained the same.

EXAMPLE 3

The same mixture used in Example 2 was extruded in a fluidized state from a tubular nozzle. After supercooling, in an attempt to obtain a thermo-contractive tube film of 60 mm in folded diameter, the extruded tube was inflated under the same conditions as in Example 1 but on shaping drums of different radii, more particularly, on shaping drums of 50 mm, 100 mm and 200 mm in radius, to study the relationship between the radius of curvature of the shaped film casing and the radius of the shaping drum.

The curved film casings were each inflated with air and the inner periphery of the casing was traced on paper for measuring the radius. As a result, it was confirmed that the film casing had a radius of curvature substantially same as that of the drum on which it was shaped.

What is claimed is:
1. A method for producing an arcuately curved tubular film casing comprising the steps of:
   extruding a vinylidene chloride-based copolymer resin to form a non-crystalline, non-stretched resin tube;
   cooling the extruded resin tube immediately;
   advancing the resin tube along and in contact with a cylindrical shaping surface;
   longitudinally stretching said resin tube continuously while in contact with said shaping surface;
   inflating said resin tube continuously while advancing said tube in an arcuate path along and in contact with said cylindrical shaping surface, to produce circumferential stretching, said circumferential stretching occurring to a greater degree at the outer periphery than at the inner periphery to produce an arcuately curved form without application of heat; and
   removing said resin tube from said shaping surface under a tension less than that required to stretch the film.
2. A method as defined in claim 1, wherein said vinylidene chloride-based copolymer resin is a copolymer of 65 to 95 parts by weight of vinylidene chloride and 5 to 35 parts by weight of a copolymerizable monomer.
3. A method as defined in claim 1, wherein said shaping surface has a circular, semi-circular or horse shoe-like shape in a transverse section.
4. A method as defined in claim 1, wherein said shaping surface is formed of a plurality of bars or rolls which are arranged circularly in a transverse section so as to support the film under inflation.
5. A method as defined in claim 1, wherein said longitudinal and circumferential stretching are each within the range of 1.1 to 4.0 times the original length and circumference, respectively.

* * * * *